United States Patent
Violante et al.

(10) Patent No.: US 8,417,075 B2
(45) Date of Patent: Apr. 9, 2013

(54) MULTI-CHANNEL ELECTRO-MAGNETIC ROTARY JOINT USING A TRAPEZOIDAL METAMATERIAL DE-ROTATING MECHANISM

(75) Inventors: Louis D. Violante, Monroe Township, NJ (US); Boying B. Zhang, Lawrenceville, NJ (US); Hong Zhang, North Brunswick, NJ (US)

(73) Assignee: Princetel, Inc., Hamilton, NJ (US)

( * ) Notice: Subject to any disclaimer, the term of this patent is extended or adjusted under 35 U.S.C. 154(b) by 245 days.

(21) Appl. No.: 12/985,177

(22) Filed: Jan. 5, 2011

(65) Prior Publication Data

US 2012/0170888 A1 Jul. 5, 2012

(51) Int. Cl.
*G02B 6/26* (2006.01)

(52) U.S. Cl.
USPC ............................................................ 385/26

(58) Field of Classification Search ...................... 385/26
See application file for complete search history.

(56) References Cited

U.S. PATENT DOCUMENTS

| | | | | |
|---|---|---|---|---|
| 4,109,998 | A * | 8/1978 | Iverson | 385/26 |
| 4,460,242 | A | 7/1984 | Birch | |
| 5,271,076 | A | 12/1993 | Ames | |
| 6,301,405 | B1 * | 10/2001 | Keil | 385/25 |
| 7,027,681 | B2 * | 4/2006 | Soljacic et al. | 385/16 |
| 7,239,776 | B2 * | 7/2007 | Oosterhuis et al. | 385/25 |
| 7,373,041 | B2 | 5/2008 | Popp | |
| 7,474,823 | B2 * | 1/2009 | Wang et al. | 385/37 |
| 7,650,054 | B2 * | 1/2010 | Merlet et al. | 385/26 |
| 8,335,409 | B2 * | 12/2012 | Popp | 385/26 |
| 2007/0019908 | A1 * | 1/2007 | O'Brien et al. | 385/36 |
| 2011/0262072 | A1 * | 10/2011 | Lewis et al. | 385/26 |
| 2012/0148189 | A1 * | 6/2012 | Zhang et al. | 385/24 |

* cited by examiner

*Primary Examiner* — Charlie Peng

(57) ABSTRACT

A multi-channel electro-magnetic rotary joint has been invented in which one or more electro-magnetic signals can be transmitted simultaneously from a rotating collimator array and a stationary collimator array in air and in other fluids. A metamaterial de-rotating mechanism is positioned in the path between said rotating collimator array and said stationary collimator array, and arranged tier rotation relative to each collimator arrays at a rotary speed equal to one-hall the relative rotational rate between said rotating and stationary collimator arrays.

12 Claims, 5 Drawing Sheets

MULTI-CHANNEL ELECTRO-MAGNETIC ROTARY JOINT USING A TRAPEZOIDAL METAMATERIAL DE-ROTATING MECHANISM

BACKGROUND OF THE INVENTION

A typical rotary joint consists of a fixed collimator holder and a rotatable collimator holder which are relatively rotatable each other to allow uninterrupted transmission of electro-magnetic signals through the rotational interface from collimators on any one of the holders to the collimators on another holder.

The multi-channel fiber optic rotary joints of typically utilize a de-rotating mechanism between the fixed collimator holder and the rotatable collimator holder. The optic de-rotating mechanism can be Dove prism, Delta prism, Abbe-Konig prism, and Schmidt-Pechan prism, which rotates at half the speed of rotation of the rotatable fiber collimator holder.

The examples of the prior arts include U.S. Pat. No. 4,109,998 (Dove prism), U.S. Pat. Nos. 4,460,242, 5,271,076 (Dove prism), U.S. Pat. No. 7,373,041 (Dove prism & Abbe-Konig prism) and US 2007/0019908 (Schmidt-Pechan prism & Abbe-Konig prism).

U.S. Pat. No. 4,109,998 rotary joint utilizes Dove prism as a de-rotation mechanism to de-rotate the images of an input set of optic transmitters located on the rotor, so that they may be focused onto stationary photo detectors located on the stator. De-rotation is accomplished by gearing the rotor and the prism in such a way that the prism rotates half as fast as the rotor. The optical rotary joint in U.S. Pat. No. 4,109,998 utilize light emitting diodes (LIDS) or lasers and laser detectors instead of optic fibers. As a result, it does not require the high alignment accuracy required for optic fibers, because the detectors may be quite large. The device is not bidirectional.

U.S. Pat. No. 4,460,242 discloses an optic slip ring employing optical fibers to allow light signals applied to any one or all of a number of inputs to be reproduced at a corresponding number of outputs of the slip ring in a continuous manner. It includes a rotatable output member, a stationary input member and a second rotatable member which is rotated at half the speed of the output member like a de-rotator. The input member having a plurality of equi-spaced light inputs and the output member having a corresponding number of light outputs and the second rotatable member having a coherent strip formed of a plurality of bundles of optical fibers for transmitting light from the light inputs on the input member to the light outputs.

Most of the prior arts with de-rotating mechanisms can only be used in air because fluids, having similar index of refraction to glass, would render the de-rotating mechanisms, such as a Dove Prism, useless. Additional they are limited to use in optics or the visible part of the electro-magnetic spectrum.

Metamaterials or left handed materials have long been known to be theoretically possible but do not occur naturally and have only been realized recently. These composite materials are engineered to have a negative index of refraction and can be manufactured for any desired frequency range over the entire electro-magnetic spectrum. They are so called left handed materials because rather than refracting light across the normal, like naturally occurring right handed materials, these materials refract light on the same side of the normal. This property is critical in to reducing the size of the de-rotating mechanism.

SUMMARY OF THE INVENTION

The object of the present invention is to utilize a metamaterial de-rotating mechanism to realize a multi-channel electro-magnetic rotary joints which can simultaneously transmit one or more electro-magnetic signals through a single mechanical rotational interface with a very low-profile which could be used in air and other fluids.

DETAILED DESCRIPTION OF THE INVENTION

Figure 1:
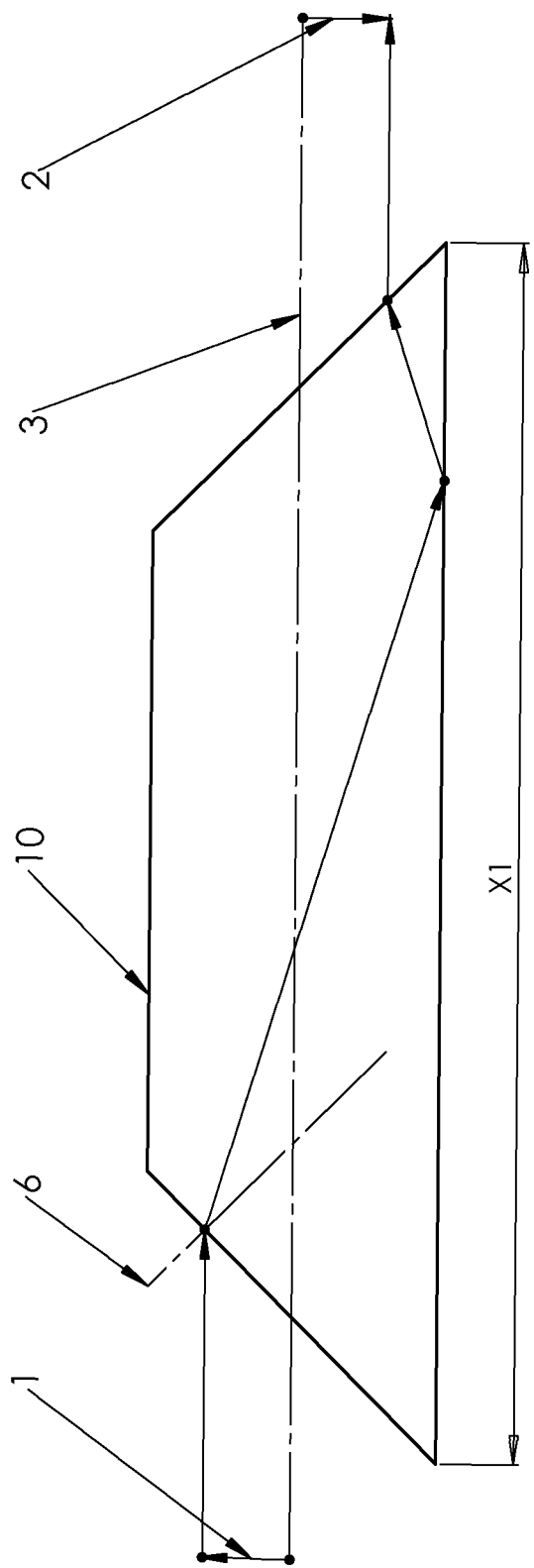
FIG. 1—Is the schematic drawing of de-rotating Dove prism.

Dove prisms are used to invert an image and when they are rotated along their longitudinal axis, the transmitted image rotates at twice the rate of the prism (see FIG. 1). Therefore, if the prism rotates at half the rate of a rotating object, the image after passing through the prism will appear to be stationary. FIG. 1 is the schematic drawing of de-rotating Dove prism in the prior art. The image (2) of an object (1) is inverted by the Dove prism (10). Furthermore, if the prism (10) is rotated about the optic axis (3), the image (2) rotates at twice the rate of rotation of Dove prism (10). It is important to note that since a dove prism is made from a classic material the light refracts on the opposite side of the normal (6) which means the shortest possible length of the dove prism is X1.

Metamaterials are engineered composite materials that have only recently been realized. One of the most important advantages of metamaterial compared to classical materials is that they have a negative index of refraction allowing them to refract an electro-magnetic signal on the same side of the normal. This will allow for a much smaller de-rotating mechanism.

Figure 2:
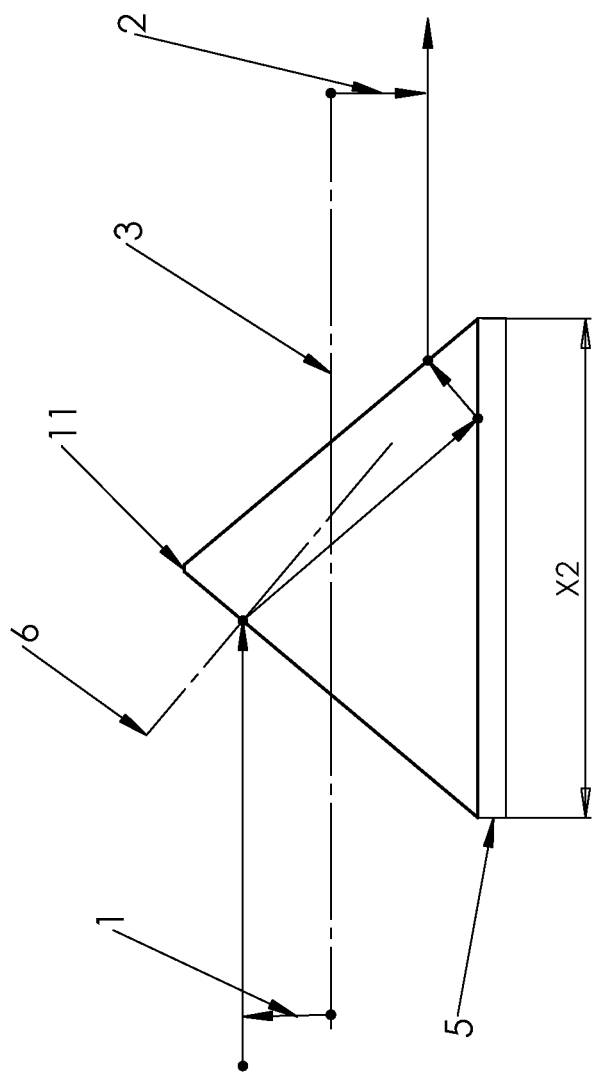
FIG. 2—Is an outline diagram a metamaterial in the present invention.

FIG. 2 illustrates imaging principle of a metamaterial de-rotating mechanism in the present invention. The image (2) of an object (1) on the entrance side of a metamaterial (11) is inverted in a similar way as the Dove prism (10) in FIG. 1. However, there are a few critical differences. First since the metamaterial de-rotating mechanism refracts an electro-magnetic signal on the same side of the normal (6) resulting in a length of X2. One can convince themselves that because the signal refracts on the same side of the normal (6) X2 in FIG. 2 will always be less then X1 in FIG. 1.

Also, since the metamaterial by definition has a negative index of refraction, which is lower than the index of refraction for air, total internal refraction does not natural occur off the bottom surface. Therefore, a reflective layer (5) is placed along the bottom of the metamaterial to create this reflection. A second metamaterial with a lower index of refraction or a photonic hand gap material with a band gap that correlates to the wavelength of the electro-magnetic signal being passed through the de-rotating mechanism can be used the same way. This second layer is not required in the traditional dove prism because the index of refraction on the prism is greater than the index of refraction of air, therefore total internal refraction will naturally occur off of the bottom surface.

Figure 3:
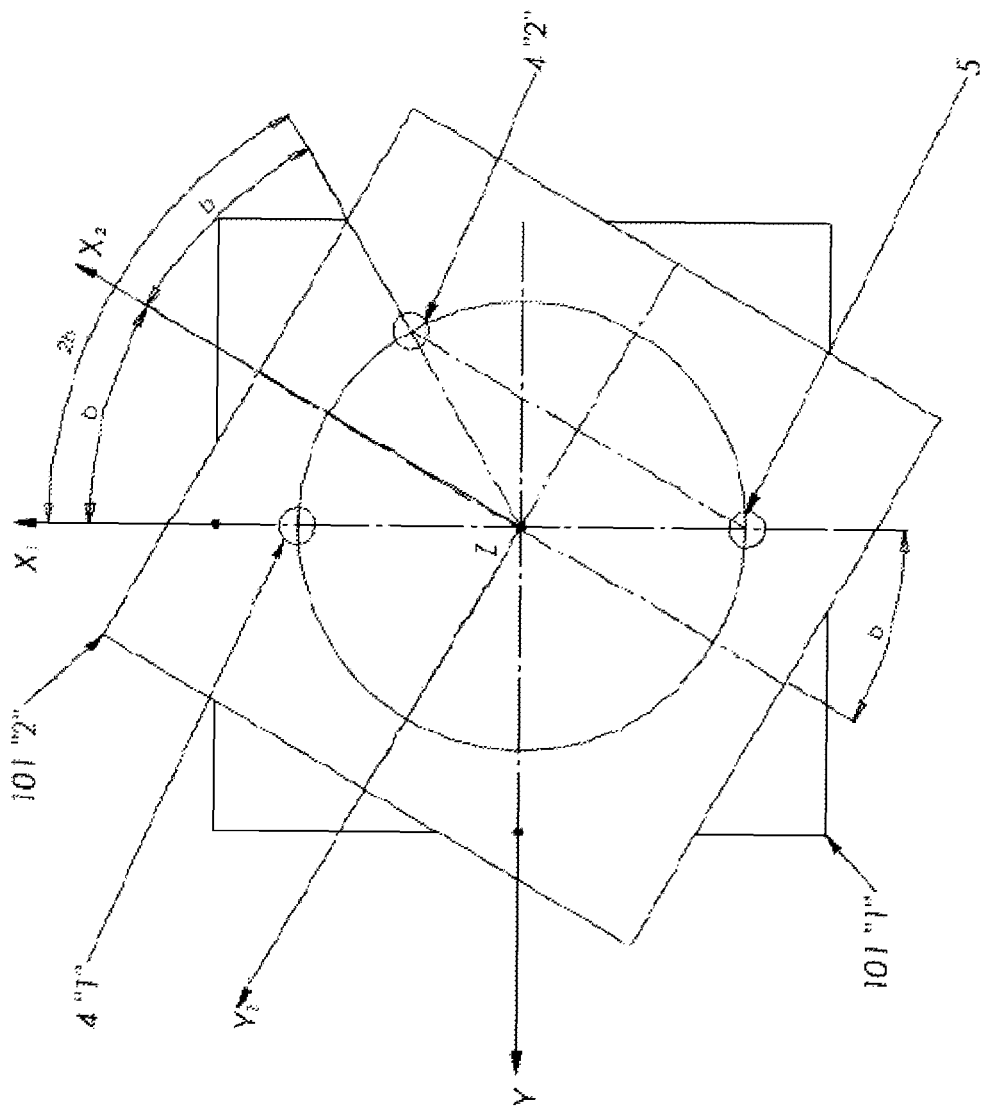
FIG. 3—Illustrates the principles of a metamaterial de-rotating mechanism for a multi-channel electro-magnetic rotary joint in the present invention.

FIG. 3 depicts how the metamaterial (101) can be used as a de-rotating mechanism for a multi-channel electro-magnetic rotary joint in the present invention. Suppose the metamaterial (101) rotates an angle "b" around its axis "Z" from position "1" to position "2", e.g., from 101"1" to 101"2". The co-ordinates of the object (4) in position "1", e.g., 4 "1", is (X1, Y1). According to FIG. 2, because the image (5) is inverted symmetrically relative to the axis "Z", the co-ordinates of the image (5) in position "1" are (−X1, Y1). If the object rotates an angle "2b" around axis "Z" in the same direction as the metamaterial (101), the co-ordinates of the object (4) in position "2", e.g., 4 "2", are (X2, Y2). Its easy to get that co-ordinates of the image (5) in position "2" are (−X2, Y2). So the absolute position of the image (5) remains the same before and after the rotation. That means that if the metamaterial rotates at half the speed of a rotating object (4), its image (5) alter passing through the metamaterial (101), will remain to be stationary.

Figure 4:
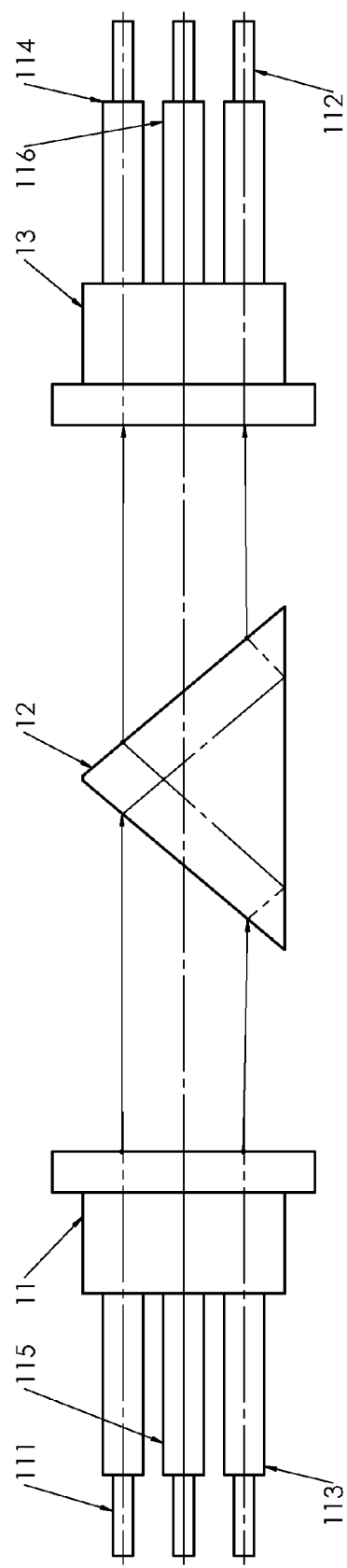
FIG. 4—Depicts the position of metamaterial de-rotating mechanism relative to a stationary collimator array and a fiber collimator array in the present invention.

In FIG. 4, a metamaterial de-rotating mechanism (12) in the present invention is positioned between a stationary collimator array (13) and a rotary collimator array (11). The rotary collimator array (11), the stationary collimator array (13) and the metamaterial de-rotating mechanism (12) are rotatable around a common axis (15). All the collimators (111, 112, 113, 114, 115, 116 . . . ) in said stationary collimator array (13) and said rotary collimator array (11) are arranged parallel to the common axis (15). If metamaterial de-rotating mechanism (12) rotates at half the speed of rotation of said rotary collimator array (11) around the common axis (15), the electro-magnetic signals from the rotary collimator array (11) would be passed through the metamaterial de-rotating mechanism (12) and transmitted to the related channel of the stationary collimator array (13) respectively, e.g., the first channel electro-magnetic signal can be transmitted between collimator (111) and (112); the second channel electro-magnetic signal can be transmitted between collimator (115) and (116); the third channel electro-magnetic signal can be transmitted between collimator (113) and (114), so as to provide a continuous, bi-directional, multi-channel electro-magnetic signal transmission between two collimator arrays.

Figure 5:
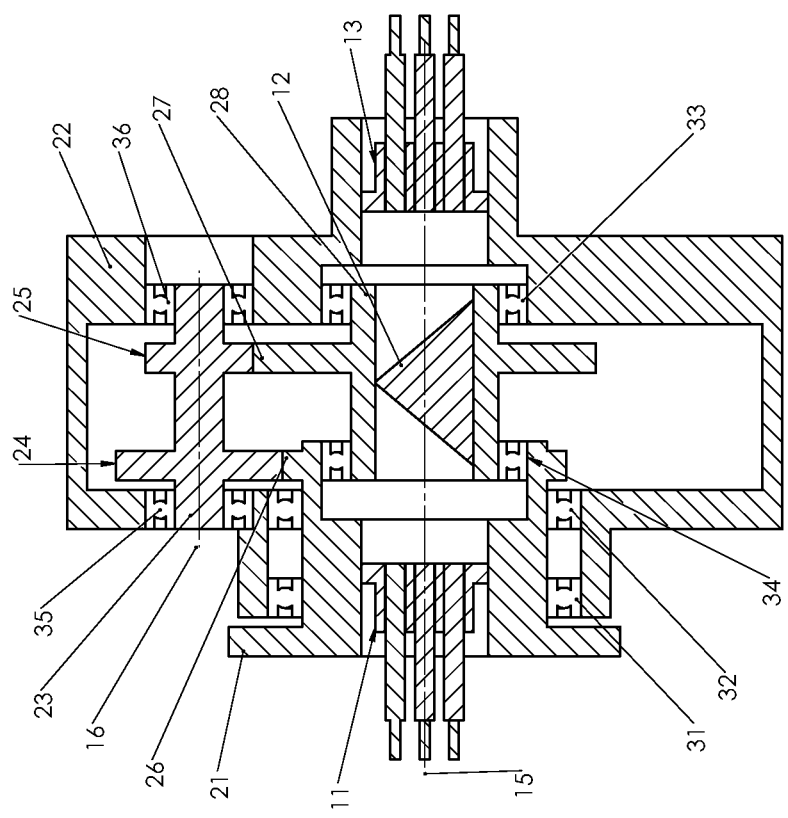
FIG. 5—Is a cross-sectional view of a multi-channel electro-magnetic rotary joint in the present invention.

FIG. 5 depicts one of embodiments of a multi-channel electro-magnetic rotary joint of the present invention. A speed reduction mechanism includes gears (24, 25, 26, and 27) in which two gears (26 and 27) are rotatable around the common axis (15), while the other two gears (24 and 25) are rotatable around a parallel axis (16). The gear ratio i from gears 26 to gear 27 can be determined as follows:

$$i = \frac{Z_{24} Z_{27}}{Z_{26} Z_{25}}$$

where, $Z_{24}$, $Z_{25}$, $Z_{26}$ and $Z_{27}$ are the number of gear teeth number for gears 24, 25, 26 and 27 respectively. If the gear ratio i=2:1, that means gear 27 will rotate at half the speed of the rotation of gear 26.

As illustrated in FIG. 5, the metamaterial de-rotating mechanism (12), the stationary collimator array (13) and the rotary collimator array (11) are fixed in the center of the cylinder (28), the stator (22) and the rotor (21). The relative position between the metamaterial de-rotating mechanism (12), the stationary collimator array (13) and the rotary collimator array (11) are the same as depicted in FIG. 4. The rotor (21) is part of a gear (26), which is rotatable relative to the stator (22) through the bearings (31 and 32). The cylinder (28) is part of a gear (27), which is rotatable relative to the stator (22) through the bearings (32 and 34). Two gears (24 and 25) are physically connected to the common shaft (23), which is rotatable around the parallel axis (16) relative to the stator (22) through two bearings (35 and 36). As stated above, the gear ratio i=2:1 would assure that the metamaterial de-rotating mechanism (12) will rotate at half the speed of the rotation of the rotary collimator array (11).

We claim:

1. A multi-channel electro-magnetic rotary joint for electro-magnetic signal transmissions comprising:
a first collimator array with a rotary axis;
a second collimator array with a rotary axis;
a metamaterial de-rotating mechanism;
said first collimator array and said second collimator array are aligned with said rotary axes and relatively rotatable along said rotary axes and having a metamaterial de-rotating mechanism positioned in the path between said first collimator array and said second collimator array, wherein is arranged for rotation around said rotary axes relative to each of said first and second collimator arrays at a rotary speed equal to one-half the relative rotational rate between said first and second collimator arrays;
and a speed reduction mechanism for providing the rotation between said metamaterial de-rotating mechanism and said first and second collimator array to rotate the metamaterial de-rotating mechanism at a rotational rate half the rotational rate of said first and second collimator array.

2. For the multi-channel electro-magnetic rotary joint of claim 1, wherein said metamaterial de-rotating mechanism is a metamaterial for the desired frequency range within the electro-magnetic spectrum with a second material attached to the bottom surface in such a way as to provide an interface consisting solely of the metamaterial and the second material along the entire bottom surface of the metamaterial.

3. For the multi-channel electro-magnetic rotary joint of claim 2, wherein said second material along the entire bottom surface of the metamaterial is a reflective layer for the desired frequency range within the electro-magnetic spectrum attached to the bottom surface.

4. For the multi-channel electro-magnetic rotary joint of claim 2, wherein said second material along the entire bottom surface of the metamaterial is a photonic band gap material for the desired frequency range within the electro-magnetic spectrum attached to the bottom surface.

5. For the multi-channel electro-magnetic rotary joint of claim 2, wherein said second material along the entire bottom surface of the metamaterial is a photonic band gap material for the desired frequency range within the electro-magnetic spectrum attached to the bottom surface.

6. The multi-channel electro-magnetic rotary joint in claim 3, wherein a metamaterial de-rotating mechanism having similar performance in air and in other fluids.

7. The multi-channel electro-magnetic rotary joint in claim 4, wherein a metamaterial de-rotating mechanism having similar performance in air and in other fluids.

8. The multi-channel electro-magnetic rotary joint in claim 5, wherein a metamaterial de-rotating mechanism having similar performance in air and in other fluids.

9. For multi-channel electro-magnetic rotary joint of claim 1, wherein said speed reduction mechanism is a gear mechanism with a gear ratio of 2:1, or any other passive mechanical system.

10. A multi-channel electro-magnetic rotary joint for electro-magnetic signal transmissions comprising:
- a first collimator array with a rotary axis;
- a second collimator array with a rotary axis;
- a metamaterial de-rotating mechanism;
- said first collimator array and said second collimator array are aligned with said rotary axes and relatively rotatable along said rotary axes and having a metamaterial de-rotating mechanism positioned in the path between said first collimator array and said second collimator array, wherein is arranged for rotation around said rotary axes relative to each of said first and second collimator arrays at a rotary speed equal to one-half the relative rotational rate between said first and second collimator arrays;
- and a speed reduction mechanism for providing the rotation between said metamaterial de-rotating mechanism and said first and second collimator array to rotate the metamaterial de-rotating mechanism at a rotational rate half the rotational rate of said first and second collimator array, wherein said speed reduction mechanism is a gear mechanism with a gear ratio of 2:1, or any other passive mechanical system;
- said metamaterial de-rotating mechanism is a metamaterial for the desired frequency range within the electro-magnetic spectrum and a reflective layer attached to the bottom surface in such a way as to provide an interface consisting solely of the metamaterial and the second material along the entire bottom surface of the metamaterial; and
- further, said metamaterial de-rotating mechanism having a similar performance in air and in other fluids.

11. A multi-channel electro-magnetic rotary joint for electro-magnetic signal transmissions comprising:
- a first collimator array with a rotary axis;
- a second collimator array with a rotary axis;
- a metamaterial de-rotating mechanism;
- said first collimator array and said second collimator array are aligned with said rotary axes and relatively rotatable along said rotary axes and having a metamaterial de-rotating mechanism positioned in the path between said first collimator array and said second collimator array, wherein is arranged for rotation around said rotary axes relative to each of said first and second collimator arrays at a rotary speed equal to one-half the relative rotational rate between said first and second collimator arrays;
- and a speed reduction mechanism for providing the rotation between said metamaterial de-rotating mechanism and said first and second collimator array to rotate the metamaterial de-rotating mechanism at a rotational rate half the rotational rate of said first and second collimator array, wherein said speed reduction mechanism is a gear mechanism with a gear ratio of 2:1, or any other passive mechanical system;
- said metamaterial de-rotating mechanism is a metamaterial for the desired frequency range within the electro-magnetic spectrum and a photonic band gap material for the desired frequency range within the electro-magnetic spectrum attached to the bottom surface in such a way as to provide an interface consisting solely of the metamaterial and the second material along the entire bottom surface of the metamaterial; and
- further, said metamaterial de-rotating mechanism having a similar performance in air and in other fluids.

12. A multi-channel electro-magnetic rotary joint for electro-magnetic signal transmissions comprising:
- a first collimator array with a rotary axis;
- a second collimator array with the ry axis;
- a metamaterial de-rotating mechanism;
- said first collimator array and said second collimator array are aligned with said rotary axes and relatively rotatable along said rotary axes and having a metamaterial de-rotating mechanism positioned in the path between said first collimator array and said second collimator array, wherein is arranged for rotation around said rotary axes relative to each of said first and second collimator arrays at a rotary speed equal to one-half the relative rotational rate between said first and second collimator arrays;
- and a speed reduction mechanism for providing the rotation between said metamaterial de-rotating mechanism and said first and second collimator array to rotate the metamaterial de-rotating mechanism at a rotational rate half the rotational rate of said first and second collimator array, wherein said speed reduction mechanism is a gear mechanism with a gear ratio of 2:1, or any other passive mechanical system;
- said metamaterial de-rotating mechanism is a metamaterial for the desired frequency range within the electro-magnetic spectrum and a second metamaterial, which has a lower index of refraction than the previously mentioned metamaterial, attached to the bottom surface in such a way as to provide an interface consisting solely of the metamaterial and the second material along the entire bottom surface of the metamaterial; and
- further, said metamaterial de-rotating mechanism having a similar performance in air and in other fluids.

* * * * *